(12) United States Patent
Silverman

(10) Patent No.: US 7,107,619 B2
(45) Date of Patent: Sep. 12, 2006

(54) SYSTEM AND METHOD FOR THE DETECTION OF AND REACTION TO DENIAL OF SERVICE ATTACKS

(75) Inventor: Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/945,172

(22) Filed: Aug. 31, 2001

(65) Prior Publication Data

US 2003/0046577 A1    Mar. 6, 2003

(51) Int. Cl.
G06F 17/30 (2006.01)
G06F 11/00 (2006.01)

(52) U.S. Cl. ............................ 726/27; 726/23; 726/22

(58) Field of Classification Search ........ 713/200–202; 726/3, 27, 22, 23
See application file for complete search history.

(56) References Cited

U.S. PATENT DOCUMENTS

| | | | |
|---|---|---|---|
| 5,832,228 A | 11/1998 | Holden et al. | 395/200.55 |
| 5,898,830 A | 4/1999 | Wesinger, Jr. et al. | 395/187.01 |
| 6,061,798 A | 5/2000 | Coley et al. | 713/201 |
| 6,065,118 A | 5/2000 | Bull et al. | 713/200 |
| 6,092,197 A | 7/2000 | Coueignoux | 713/200 |
| 6,185,689 B1 | 2/2001 | Todd, Sr. et al. | 713/201 |
| 2002/0046223 A1 | 4/2002 | Lamberton et al. | 707/513 |

FOREIGN PATENT DOCUMENTS

WO      WO 99/48303      9/1999

OTHER PUBLICATIONS http://staff.washington.edu/dittrich/misc/ddos/.*
http://www.bindview.com/support/RAZOR/.*
http://www.bindview.com/support/Razor/Papers/.*
http://www.bindview.com/Support/RAZOR/Papers/2000/DDSA_Defense.cfm.*
http://www.sans.org/dosstep/.*
CompChall: addressing password guessing attacks Goyal, V.; Kumar, V.; Singh, M.; Abraham, A.; Sanyal, S.; Information Technology: Coding and Computing, 2005. ITCC 2005. International Conference on vol. 1, Apr. 4-6, 2005 pp. 739-744 vol. 1.*
Onion routing for resistance to traffic analysis Syverson, P.; DARPA Information Survivability Conference and Exposition, 2003. Proceedings vol. 2, Apr. 22-24, 2003 pp. 108-110 vol. 2.*
An autonomic approach to denial of service defence Gelenbe, E.; Gellman, M.; Loukas, G.; World of Wireless Mobile and Multimedia Networks, 2005. WoWMoM 2005. Sixth IEEE International Symposium on a Jun. 13-16, 2005 pp. 537-541.*
F. K. Klassen and R. M. Silverman, "System and Method for Determining Network Throughout Speed and Streaming Utilization", U.S. Appl. No. 09/746,183, filed Dec. 21, 2000.

(Continued)

Primary Examiner—David Jung
(74) Attorney, Agent, or Firm—Randall J. Bluestone; Shelley M Beckstrand; John R. Pivnichny

(57) ABSTRACT

Challenge-response and probative methods together or independent of each other enable detection of devices participating in denial of service (DOS) and distributed DOS (DDOS) attacks upon a network resource, and upon identification of devices participating in attacks, minimize the effect of the attack and/or minimize the ability of the device to continue its attack by placing the attacking devices in a state of reduced or denied service.

28 Claims, 4 Drawing Sheets

OTHER PUBLICATIONS

F. K. Klassen, R. M. Silverman, and H. R. Gail, "System and Method for Determining Network Discrete Utilization", U.S. Appl. No. 09/746,179, filed Dec. 21, 2000.

Discouraging Penetration Attempts on Interactive Computer Systems Without Denial-of-Service, IBM Technical Disclosure Bulleting, vol. 31, No. 9, Feb. 1989, pp. 147-149.

A Strong Client-Server Mutual Authentication Scheme, Research Disclosure, No. 41787, Jan. 1999.

Method for increasing security in TamperResistant PKCS11 Tokens, Research Disclosure No. 434142, Jun. 2000.

* cited by examiner

SYSTEM AND METHOD FOR THE DETECTION OF AND REACTION TO DENIAL OF SERVICE ATTACKS

CROSS REFERENCES TO RELATED APPLICATIONS

Copending U.S. patent application Ser. No. 09/746,183, filed Dec. 21, 2000 by F. K. Klassen & R. M. Silverman, entitled "System and Method for Determining Network Throughput Speed and Streaming Utilization" (hereafter, Silverman 1), and Ser. No. 09/746,179, filed Dec. 21, 2000 by F. K. Klassen, R. M. Silverman, and H. R. Gail, entitled "System and Method for Determining Network Discrete Utilization" (hereafter, Silverman 2) are assigned to the same assignee hereof and contain subject matter related, in certain respect, to the subject matter of the present application. The above-identified patent applications are incorporated herein by reference.

BACKGROUND OF THE INVENTION

1. Technical Field of the Invention

This invention relates to monitoring and analyzing a communications network for the purpose of detecting "hacker" attacks and computer terrorism, and to providing for defense and counterattack. More particularly, the invention relates to measuring and monitoring of network performance and throughput, including detection of abnormal conditions indicating presence of computer hacker denial of service attacks and reaction to such attacks by a variety of means of depriving required resources to the hacker.

2. Background Art

Managers of information systems for public and private enterprises are required to provide ever increasing network access to their information systems. As business requirements for connection to the Internet grow, system security concerns increase in lock step.

In implementations of information systems prior up to the mid-1960s, no remote system access was possible. Data was fed into and out of computers from consoles, card punches, and card readers all of which were direct-cable attached into the computer. No one outside of the "glass house" (i.e., computer room) had access to the system. The art of data-communications network security did not exist. Security was a local issue enforced by password protection, so that without the proper password, access to the data processing application would be denied. Password protection ensured that no changes could be made to the system or its contents by unauthorized parties.

Later in the 1960s, remote console and remote card read and punch system access became possible using permanent leased line or dial telephone facilities. A user of the system no longer needed to be physically present in the computer room in order to view or to modify information or programs stored in the system. In order to protect information systems from unwanted access and modification, either of which could damage or destroy a business or organization, new means of protection were devised.

For leased lines, security was ensured by identifying to the computer's operating system the specific communications port to which the leased line was connected. Since the communications port on the computer was telephone wired (by telco modem) directly to the phone company's switching station and thence through other switching stations to the modem and communications port of the console or card/read punch at the remote location, it was extremely difficult for someone to achieve unauthorized access to a computer through its communications port. Specifically, to breach the leased line security at the operating system level would require tapping into the phone line, mimicking the remote device, and having the valid application password.

Unlike a leased line connection which is permanently "hard wired" end to end by the telephone company, anyone with a telephone handset can dial the phone number of a computer system that accepts incoming dial calls. So security for computers in dial environments was achieved by either allowing only outgoing calls (and refusing all incoming calls) or else by accepting dial calls and then using a dial-back method. In the dial-back method, a user of a remote console or card device desiring access to the central computer would dial into the system over a public dial network number, providing the remote user's own phone number. The computer at the data center would then terminate the call, check to see if the remote caller's phone number was on the approved phone number list, and, if it were, then the data center's communications equipment would dial the remote user so that communication could occur. As with leased line connections, operating system-level security together with application program-level password security effectively prevented unauthorized access to the computer system. Overall then, in systems of the 1960s and through the 1980s, the user's i.d., the user's device, the user's network connection, and/or the user's password uniquely identified the user for purposes of authorization for system access.

While the dial-back method helped ensure system security at levels comparable to that of the hardwired leased line environment, the dial environment had a security issue peculiar to it and from which leased line systems did not suffer. Anyone who knew the central computer's dial port phone number(s) could repeatedly dial into the system, thereby tying up all of the computer's dial access ports and preventing access by legitimate users. Moreover, system resources would be occupied by the burden of repeatedly checking authorization and rejecting the unauthorized caller, thereby consuming valuable computer system resources, farther disrupting the computer services of the organization. For this reason, armed forces and police agencies kept computer dial access numbers strictly confidential, revealing them only on a "need to know" basis. Businesses learned to do this as well. For example, during the oil shortages of the 1970s, when petroleum product prices skyrocketed, oil companies became highly conscious of ensuring that their computer access dial numbers were kept in strictest confidence for fear that disgruntled parties would "jam" their computer systems with unwanted calls. So, where systems were exposed to general access through the public dial network, the art of network security consisted in part of simply keeping the dial numbers secret in order to prevent disruptive jamming attacks.

In the 1990s businesses and organizations of all types found themselves with a requirement to attach to the Internet in order to engage in commerce with or provide information to the public. The primary purpose of communications systems prior to the Internet was to enable the members of an organization to connect to their own organization's computer systems. In the Internet environment, organizations connect to the worldwide web often for the express purpose of allowing anyone from anywhere to connect to their system. The procedures for system security that pre-dated the Internet, namely, end-to-end hardwired leased line connections, dial-back, and application password protection that had worked well for intra-organization communication needed upgrades to meet the challenges of the new, open environment. In particular, the procedures of leased line connections, dial-back mechanisms, keeping access numbers (network addresses) secret, and operating system definitions and authorization lists were designed specifically to prevent "strangers" from accessing the organization's computer systems. In the Internet environment, it is often desirable for the organization to make its systems known to worldwide web search engines precisely for the purpose of ensuring that anyone, anywhere can locate the systems, traverse the Internet, and gain access to the organization's computing systems.

With "strangers" everywhere able to access the systems of virtually every major organization across the Internet, new procedures were developed for protecting the computer-resident resources of organizations. The new procedures included use of the TCP/IP protocol and firewall technology.

TCP/IP protocol includes the addressing of network transmission packets by means of sockets. A socket consists of an IP network-level address (representing the address of the device's network adapter) plus a TCP application-level address. Each network packet contains a "from" socket and a "to" socket. These sockets represent the originating device's network address and application identifier and the target device's network address and application identifier. Sockets provide a basis for network security because they identify the location of the packet's originator as well as the service (i.e., application) being requested. At the destination site, incoming packets can be examined and it can be determined, for example, whether or not the incoming packet's source address is that of a device that belongs to the organization, and whether or not the application service being requested is a secure (private) or non-secure (public) service. A special device can be set up to "filter" incoming requests by examining their source and destination sockets and thus serve as a gatekeeper that protects an organization's internal processing systems from intruders while allowing all corners to access to the organization's public processing systems. These special devices are called "firewalls," and they examine incoming packets' source and target sockets and determine from customized tables whether the request should be forwarded or discarded. A firewall would be used by, say, an automobile manufacturer to make sure that anyone can connect to its systems through the Internet to get general information about the models it sells and currently available rebates, while also making sure that only authorized parties can access the systems that process that company's accounts payable systems. Often firewalls are set up "behind" the organization's publicly accessible systems so that they only examine packets addressed to the organization's private, restricted-access systems in order to deny service to unauthorized parties. In this design, firewall devices are thus spared the overhead of examining packets targeted for the publicly accessible systems and only examine packets targeted for the organization's private systems and applications.

However, the current art for network and system security, which uses TCP/IP socket protocol and firewall technology does not provide complete protection for an organization's systems. Just as systems with dial ports have an exposure to "jamming" by anyone with a telephone, Internet connected systems have a similar exposure to anyone with an Internet-connected computer. Exacerbating the problem is that while it is possible and desirable for an organization to keep its computer dial access numbers secret, it is usually not desirable to do so with web addresses of systems designed for public access. This leaves the systems of Internet-connected organizations open for attacks, including jamming attacks known as denial of service (DOS) attacks or distributed denial of service (DDOS) attacks, in which streams of traffic are directed at an organization's Internet-connected systems.

An article from the *New York Times* illustrates the magnitude of the problem and the current helplessness of even state of the art facilities to cope with such attacks:

The CERT Coordination Center is one of the premier places that the online world turns to for information when computer vandals attack; the federally financed research center, operated by Carnegie Mellon University, has long served as a clearing house for news on new viruses, worms, and other virtual nastiness. But yesterday and Tuesday it was CERT that was being bombarded, and the center did not hold. Its web site was knocked out by a distributed denial of service attack, in which malicious hackers take over computers on the Internet and cause them to flood a target site with demands for data and other small tasks. A denial of service does not involve a break-in at the target site; it just keeps the victim's machine so busy responding to the stream of automated requests that legitimate visitors cannot get in. CERT, which stands for Computer Emergency Response Team, thus became one of thousands of sites each week to be subjected to this form of attack. (The Web site for the White House also came under attack on Tuesday and was blocked for about six hours, Jimmy Orr, a White House spokesman, said.) At Carnegie Mellon University in Pittsburgh, data flowed into the CERT network at rates "a couple of hundred times higher than any peak we've ever seen before," said Rich Pethia, director of the part of the Software Engineering Institute at Carnegie Mellon that runs CERT. Although computer viruses, worms, and other so-called malware can be countered with good security practices, and up-to-date defensive software, distributed denial of services attacks are hard to protect against, Mr. Pethia said: "There is no good way to defend against it or stop it once it's started. The Internet wasn't built with any built-in flow control, so there's no way to throttle back" on such attacks. He said that no one had determined where the attacks had come from and that the case was being investigated. The commandeered computers, which security experts call zombies, are often programmed to fabricate the Internet's version of a return address so that the sources of the attack are obscured. About 4,000 sites experience denial of service attacks each week, according to a new paper from researchers at the University of California at San Diego . . . *New York Times* May 24, 2001, section C, page 5, John Schwartz, "Computer Vandals Clog Antivandalism Web site."

As this article illustrates, the current art contains no effective means of defending public web sites from DDOS attacks.

Initially, DOS attacks came from individual machines from which individual hackers streamed data (e.g., ping echo packets) to web-attached servers in an effort to flood the network and burden the server with the overhead of handling the stream of data. Attacked parties learned how to diagnose, stop, and take network traces (a log of all network traffic) of DOS attacks by "lone wolf" hackers.

Today, hackers have the upper hand, because they have learned how to take control of or "borrow" multiple web-attached computers in different organizations ("masters"), use these master machines to infiltrate many more computers in different organizations ("zombies"), embed DOS attack code scripts (or, trojan-horses) in the zombies through the masters, and then issue commands from the masters to the zombies to run the scripts directed at the server(s) of a targeted organization.

The hackers, twice removed from the attacking zombie machines, are difficult to trace. The attacks coming from many different zombies in many different networks comprise DDOS attacks that are hard to detect and control. The scripts run by the zombies are a nasty assemblage of echo packet floods, status requests, incomplete logins, deliberate causes of connection error conditions, false reports of errors, and transmissions of packets requiring special handling. These vicious scripts, run from hundreds or thousands of zombies, are designed to flood the network, tie up system control blocks, and siphon web server computing power to the point that the attacked webserver network and system can no longer provide service to legitimate users. All the while, the zombie computers causing the damage are owned by legitimate organizations which have no idea that their systems are being used in attacks on other organizations.

The current best procedure for defending against such attacks, as documented in the CERT web site, consists of owners of web sites monitoring the network and server equipment they own for conditions of abnormally high utilization. When detected, high utilization is reported to the Internet Service Providers (ISPs) through which the organization connects to the Internet. Each ISP network connects to a large number of organizations. The ISPs then search their networks in order to find areas of low utilization. The ISPs trace (i.e., record) all user traffic in that area of low utilization, and then scan the recorded traces looking for devices that are issuing sequences of commands of type and frequency that attacking zombies would issue. Zombies are easier to locate in areas of lower as opposed to higher utilization because the zombies contribute a relatively higher proportion of the records in the trace log, so their activity is more readily identified. Once a zombie is located, the ISP can trace all traffic from that zombie to the attacked system, thereby enabling those fighting the attack to better understand its nature. And although commands from the master computers to the zombies are not necessary once an attack has started, an ongoing trace of the zombie's activity can, with luck, record commands being sent from the zombie's master (the computer which has loaded attack code scripts into the zombie and activated the attack). When a master is found, it is possible not only to regain control of the master, but also to reclaim all of the zombies under its control. With very good luck, it may also be possible to take traces from a master computer and locate the hacker controlling the master, although skilled hackers usually perform "hit and run" operations in which they start and stop attacks and erase their footprints in a matter of hours, long before the currently available problem diagnosis and identification processes can be effectively employed. A sixteen year old Canadian boy who brought down the sites of Amazon.com, Yahoo, e-Bay, and Charles Schwab, was identified months after his attacks not as a result of the extensive forensic diagnostic effort undertaken in response, but rather because the youth bragged in an online chat group (Ellen Messmer and Denise Pappalardo, Network World, Feb. 12, 2001).

The current procedure thus has deficiencies in the speed with which attacks are detected and the speed and efficacy of reaction to such attacks. In the future, the weak security functions and administration processes that allow hackers to take over innocent systems will be improved, making creation of armies of zombies by hackers a much more difficult task. In addition, filtering intelligence, which currently runs at the processor level and is therefore too slow and expensive to apply in a sophisticated manner to all traffic entering a web site, will be embedded into the microcode on the router cards that control individual network interfaces.

The distribution and lowering of cost of router function can be expected to improve early recognition of attacks and quick reaction by invocation of filtering to slow or stop DDOS attacks. And in the future environment in which distributed filtering prevents attacks involving floods of administrative requests, it can be anticipated that hackers will attempt DDOS non-administrative flooding of servers.

In response to the current DDOS environment, it is an object of the invention to provide system and method for faster, more effective detection of utilization spikes associated with DDOS attacks.

It is a further object of the invention to provide a system and method for prevention of both administrative and non-administrative message flooding DDOS attacks.

SUMMARY OF THE INVENTION

In accordance with the a first aspect of the invention, a system and method is provided for detection of DDOS (distributed denial of service) attacks, including issuing a bit mapped challenge in response to a login request from a requester of services; and responsive to an incorrect response to the challenge, placing the requester in a state of limited service.

In accordance with a second aspect of the invention, a system and method is provided for detection of DDOS attacks, including executing a network probing test frame transmission and analysis procedure to detect a hacker denial of service attack; and responsive to detecting a denial of service attack, placing the hacker in a lower level of service state.

In accordance with an aspect of the invention, there is provided a computer program product configured to be operable to detect and respond to distributed denial of service attacks.

Other features and advantages of this invention will become apparent from the following detailed description of the presently preferred embodiment of the invention, taken in conjunction with the accompanying drawings.

BEST MODE FOR CARRYING OUT THE INVENTION

In pending patent applications Silverman 1 and Silverman 2, methods are provided for determining the discrete speed and utilization of a network and the streaming speed and utilization of a network. Discrete (i.e., individual) packets and streams of packets travel at different speeds across any given multihop connection. The stream has a rate approaching the bottleneck facility speed in the connection, while discrete packets travel at a slower speed. End-to-end discrete utilization increases incrementally for each hop with competing traffic in the connection, whereas streaming utilization has effect only on that hop having the lowest available throughput.

By means of the system and method described in the predecessor patent applications, the end-to-end discrete and streaming speeds and utilizations of the network can be computed for any connection.

One level of DDOS detection consists of using the system and methods described to detect spikes in streaming and discrete utilization. Since this method works across both the network of the web server under attack and the network of the ISPs across which the attack is occurring, the attacked party will (1) recognize the attack more quickly than before; (2) recognize areas of higher network utilization and lower utilization in both the intranet and in the connecting ISP networks so that the organization under attack can provide fast guidance to the ISPs as to the location of areas of low utilization (where traces can be taken with a degree of probability of locating instances of zombies) and high utilization (where defensive ISP router filtering scripts may most profitably be invoked) instead of relying on the ISPs to perform this activity; and(3) be able to "fingerprint" the utilization patterns of zombies and identify their occurrences thus enabling faster recognition of attacks and faster diagnosis of the origin of the attacks.

In accordance with a preferred embodiment of the invention, a system and method is provided for preventing DDOS attacks. DDOS attacks are accomplished by hackers who infiltrate sets of computers (masters) and then use each master to infiltrate "trojan-horse" code scripts into a large number subservient computers (zombies). The zombies' scripts are then activated at some point of time in a coordinated attack on an organization's web server system. Zombies are "borrowed" machines that run scripts to attack.

Figure 1:
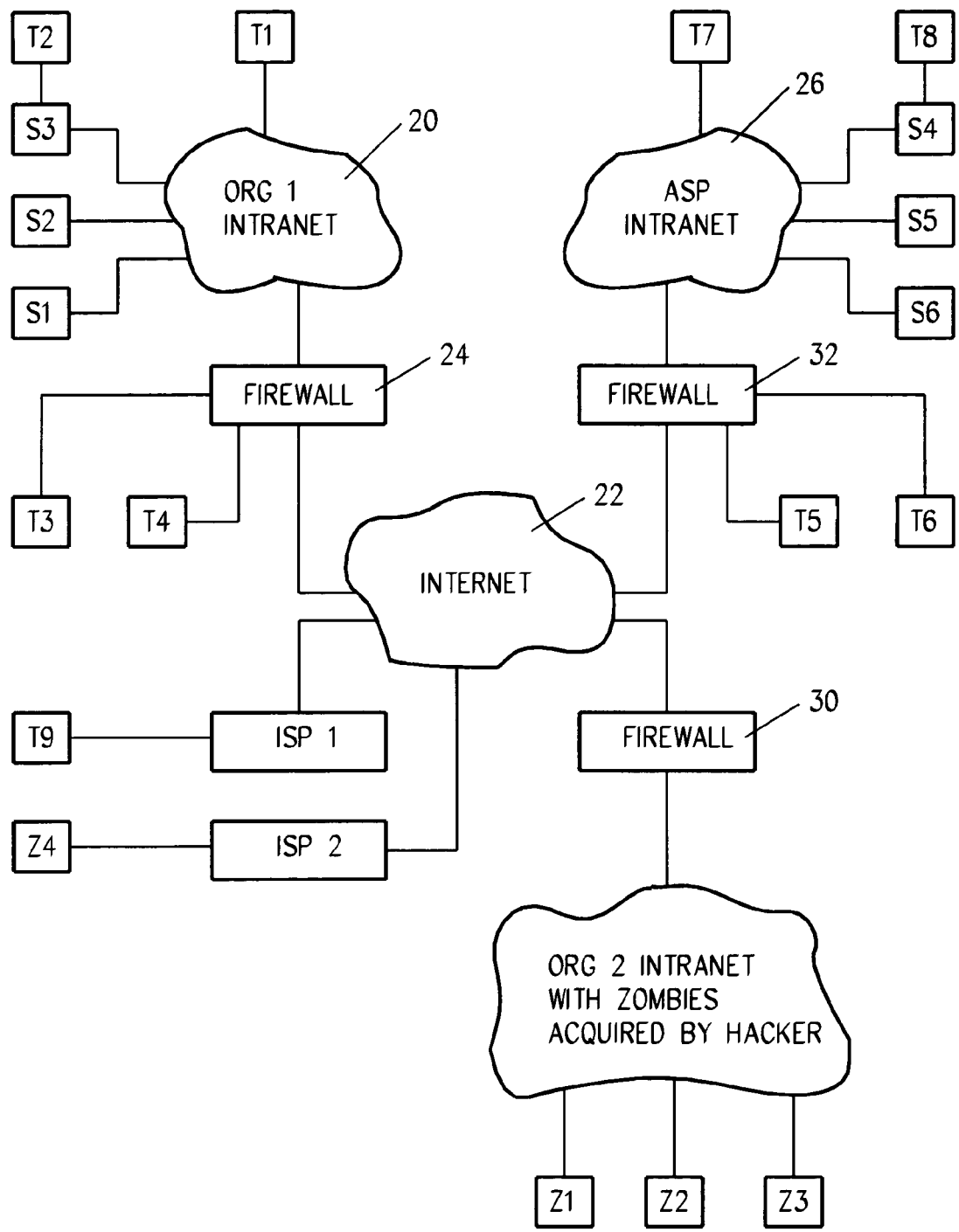
FIG. 1 illustrates a communications network and network evaluation system in accordance with the preferred embodiment of the system of invention for detecting and preventing DDOS attacks.

Referring to FIG. 1, S1, S2, . . . S6 are server machines, meaning that they are computers running application programs accessed by local and remote users; T1, T2, . . . T9 are test stations, meaning that they run the code that performs network speed, utilization, and latency testing as described in Silverman 1 and Silverman 2; and Z1, Z2, . . . Z4 are zombie machines, meaning that they have been taken over by hackers who have installed code designed to attack servers addressable through the Internet (i.e., the zombies contain trojan-horse code intended for attack on web site servers S1, . . . S6).

Organization 1 has a set of three web servers S1–S3 in its intranet 20 that are connected to Internet 22. In this instance, although it is not necessary, they are depicted as being protected by a firewall 24. Since servers S1–S3 are intended for public access, firewall 24 is optional. Not depicted is a possible connection between this intranet 20 and a more secure intranet which would house servers belonging to Organization 1 that are not intended for public access. These latter servers, which might house applications such as accounts payable and receivable, would certainly be protected by a firewall which filters traffic in an effort to allow only authorized parties to access those secure servers.

Three test stations T1–T3 are depicted in Org 1's intranet 20. Not all three are required. However, T2 depicts that a test station can be located within an application server S3, T3 within or adjacent to the firewall 24, or T1 anywhere else within intranet 20.

The application service provider (ASP) intranet 26 has the same setup. This is a third party entity that for a fee hosts web services for organizations such as Organization 1. Akamai is an example of an ASP.

Test stations T1–T3 can perform testing within the Org 1 intranet 20. Test stations T6–T8 can perform testing within the ASP intranet 26. For example, T1 can test T2, T3, S1, S2, and S3. T4 belongs to Org 1 but sits outside the Org 1 firewall and is not part of the Org 1 intranet. T4 is connected to internet 22 without firewall separation. It can perform testing anywhere in and across the internet up to any firewall. So T4 can test Z4, T5, and T9.

Testing is ordinarily performed by means of ICMP pings. ICMP is part of the TCP/IP protocol stack, so nearly all Internet connected devices respond to pings. Ordinarily, firewalls do not allow pings to pass, so testing is normally easy within networks and up to their firewalls. Firewalls that do not pass pings can be successfully passed through for testing if there is a port (an application address) for which the firewall does not block traffic and for which the testing station and receive station are programmed to communicate. Such programming is also required for one way pinging, as described in Silverman 1 and Silverman 2.

By way of example, in operation, suppose a hacker has taken over and zombified (that is, infected with a trojan-horse code) Z1, . . . ,Z4. Suppose Organization 1 services web users through servers S1, . . . ,S3 in its intranet 20 as well as through S4, . . . ,S6 in the ASP intranet 26. Org 1 pays a fee to the ASP and both the ASP and Org 1 have test equipment running the test code.

Suppose also that zombies Z1, . . . ,Z4 contain no cooperative code for testing, and that they will only respond to pings. Suppose further that Organization 2, which is the unwitting owner of Zombies Z1, . . . ,Z3, has programmed its firewall so that pings do not get through it. The hacker has set a timer, and now the attacks begin.

T3 and T6 have been monitoring their respective intranets 20, 26, so there is a record of average utilization (per time of day). If the zombies are successful, a utilization increase will be observed.

T4, T5, and T9, (T9 is owned by Org 1 but connected directly to the internet, possibly from an employees home or a remote Org 1 office) monitor Internet 22. They can detect areas of abnormally high utilization and can probe to find hot spots. Areas of low utilization can be reported to internet service providers (ISPs) so that they can perform tracing. In this case, T9, T4, or T5 might detect that ISP 2 (or a specific portion of ISP 2) is an area with some connections to its web site but with relatively low activity. Thus, the ISP 2 could be directed rapidly to trace and locate sources of suspicious activity. Testing could be performed possibly up to firewall 30 to determine that it is a hotbed of zombie activity. Various protective actions could then be taken, such as notifying Organization 2 and, possibly, invoking filtering at firewalls 24 and 32 to deny access to organization Org 1 and ASP organization 2 resources.

Figure 2:
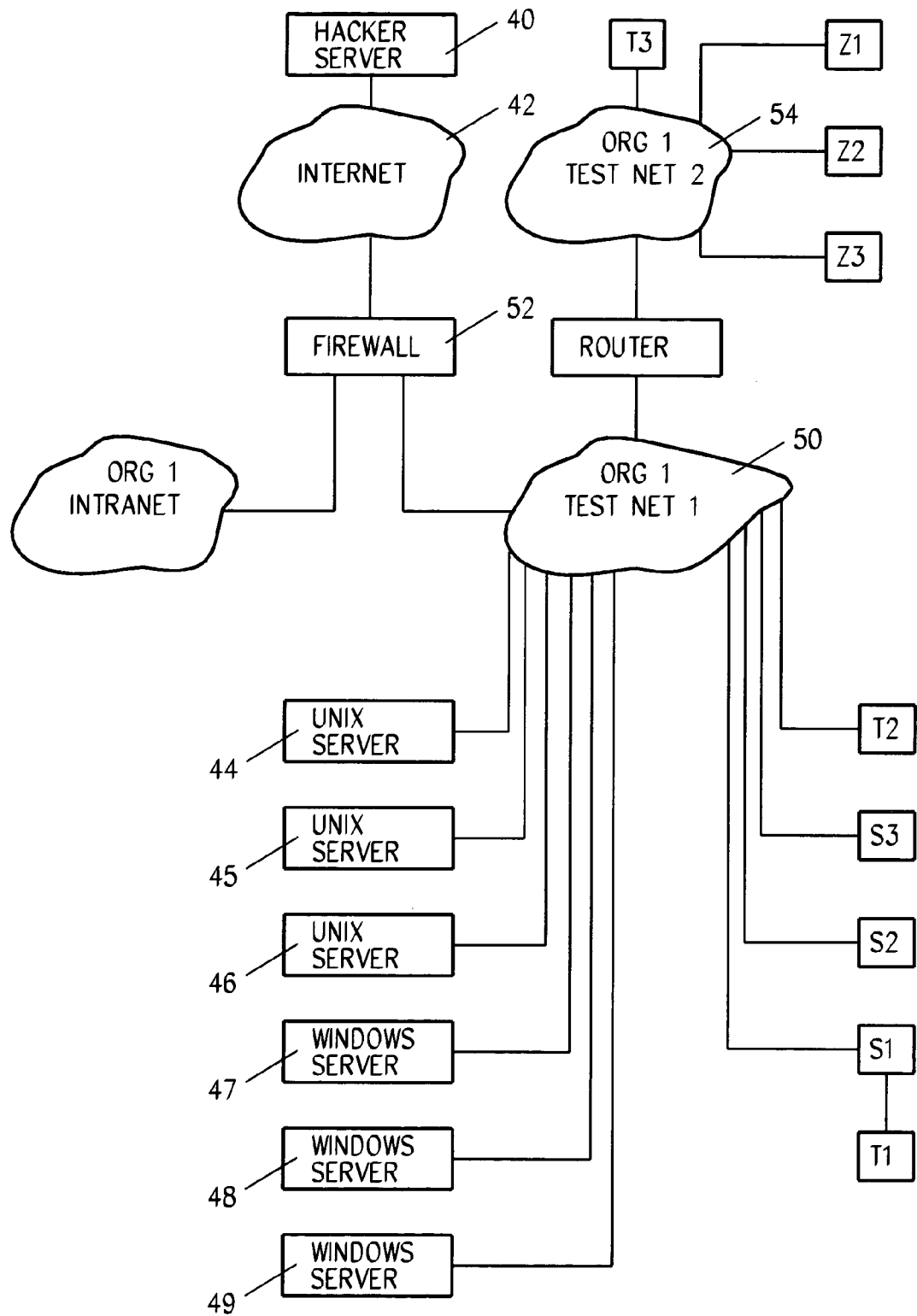
FIG. 2 illustrates a communications network and system for recognition of attacks and identification of stations involved in attacks.

Referring to FIG. 2, a hacker server 40 is located on Internet 42. This device contains scripts which hackers can load into their systems and then probe for susceptible web-attached devices into which the scripts can be loaded as trojan-horse code. These devices will become zombie masters Z1–Z3. In turn, the zombie masters Z1–Z3 can infiltrate hundreds or thousands of other web-attached computers, turning them into zombies, which can be unleashed as an army of attackers on command from the master.

Hacker servers 40 are often well-known devices with addresses available through Internet chat-rooms. As shown in FIG. 2, Unix and Windows systems 44–49 are located in an organization's test network 50. Various versions of Unix and Microsoft Windows operating systems are the prevalent operating systems for web-attached devices, and the diagram represents that some combination is being employed here. These devices 44–49, on Test Net 50, can access Internet 42 and download master attack scripts from hacker server 40. Test devices located Test Net 2 can be taken over by these masters and enrolled as zombies Z1–Z3. The zombies can then launch an attack on servers (here depicted as S1, . . . ,S3 on Test Net 50, although they could be on any other test network).

T1, . . . ,T3 are network testing devices running the code described in this application and in Silverman 1 and Silverman 2, which measures network speed, latency, and utilization. Successive tests can be run to see the utilization patterns of individual zombies and groups of zombies to fingerprint the patterns of traffic generated by different, well-known attack scripts, or trojan-horse code.

This will aid in recognition of attacks and identification of stations involved in attacks.

Two notes. First, many organizations already have such test networks in place in order to test new releases of code and to assist in capacity and change tests. So a test station such as T2 could be used to determine and record the patterns of a normal system load as well as how that load changes when an attack is launched. Second, without loss of generality, a firewall (not shown) could be set up between Test Net 50 and Test Net 54, and the patterns of traffic from the zombies could be observed from both Test Net 1 and Test Net 2.

The attack prevention system and method of a preferred embodiment of the invention includes a bit-mapped challenge issued by the web server to any login request. Preferably, the challenge contains no EBCDIC or ASCII text. All text and pictures are bit-mapped, so that without a human operator's intervention, the simple challenges to the login request (e.g., "click on the picture of the cow to continue," with 20 different types of animals pictured, or "enter the result of adding two plus two in the box to the left") cannot be correctly answered by the zombie except by blind luck. Devices that respond incorrectly to the challenge are placed into a state of "purgatory" in which they receive lower or reduced service, such as very limited service or none at all. Devices with human operators will easily answer the challenge, and receive first-class service. This method will prevent zombies from asking for repetitive services from the web site servers from within a connection. From a system perspective, this prevents the zombies from causing connection-supporting control blocks to be maintained and server resources to be used in sufficient quantity to deny service to others.

However, it is still possible that a zombie will iteratively request connection to a web site, even if it will not be able to connect. In this case, the network address of the zombie device will be known to the firewall and/or load balancing software (load balance server 64, FIG. 4) so that subsequent connection requests can be filtered out or shunted to a connection with the purgatory (lower) level of service (service provider 62, FIG. 4). This method will be effective in cutting off individual or very large numbers of attacking zombies, and can be "akamaized" (that is, placed at the edge of the Internet by a service provider, such as Akamai servers), thereby limiting the traffic overhead of zombies.

In some instances of attacks, zombies will repeatedly request connections that their controlling scripts will not complete, thereby tying up the attacked system's control blocks, denying system access to others, and will give a new false address for each such attempt. For such cases, the system and methods of Silverman 1 and 2 provide a method for determining the speed, latency, and average queuing delay of the network. This information is then used to help set a timeout value tailored to each login request, so that if the user does not complete the login within the time limit, the control blocks are freed. Repetitive efforts from a station which masquerades under fictitious addresses can be pinpointed by the unique speed and latency of their connection and ejected immediately, or placed into limited service or purgatory category, such as cutting off entirely or providing a lower level of service, thereby freeing prime web site service for legitimate users. Using the methods of Silverman 1 and 2, a plurality of network evaluation signals, or probative test packets, are selectively sent and received through the network. Responsive to these evaluation signals, selective network evaluation parameters are determined and stored. Algebraic, statistical, and queuing theory analysis, responsive to these parameters, determines the response time and throughput characteristics, including capacity, utilization and performance, of the network. Responsive to network evaluation parameters that are determined and stored, a system and method for determining presence of network "hacker attacks" and for lessening the effect of, discouraging, and repelling such attacks by a "challenge-response" is provided.

The system and method of the preferred embodiment of the invention combines a challenge-response login procedure with use of a network probing test frame transmission and analysis procedure. The challenge-response procedure and the network probing test frame transmission procedure can run separate from each other or together for the purpose of DDOS detection and deterrence and further for improving system performance and system management.

The challenge-response procedure of a preferred embodiment of the invention is provided for detecting and preventing robotic logins to public web servers.

The probative test and analysis procedure of a preferred embodiment of the invention provides for (1) creating template fingerprints or signature patterns of attack patterns; (2) establishing the historical, current, and predicted future of states of a network for all types of network traffic; (3) determining if a spike in traffic is a distributed denial of service (DDOS) attack; and if so, determining its sources; (4) determining the unique speed and latency network attachment characteristics of devices when they attempt to connect or when it is determined that the connection will not be successful or after connection when a pattern of abusive behavior is observed; and (5) using that pattern to deny service or give lower service to that device when it requests additional service.

The challenge-response and probative methods together or independent of each other enable or assist in enabling detection of devices participating in DOS and DDOS attacks and upon identification of devices participating in attacks, minimize the effect of the attack and/or minimize the ability of the device to continue its attack.

The system and method of the preferred embodiments of the invention complement and strengthen other techniques for defeating DDOS attacks. Other techniques for suppression of DDOS attacks include (1) shoring up "backdoor" access to web-attached servers through which hackers install "trojan-horse" code from which they can commence DDOS attacks; and (2) implementing filtering technology on router cards so that attacks can be recognized and inhibited at the edge of the network thereby protecting the servers and the network.

Shoring up backdoor access will rely on implementation of new technology and management processes on millions of computers. Any such effort will take years to be fully effective. In the meantime, hackers will be able to commandeer multitudes of web-attached computers from which they can launch DDOS attacks. Such filtering techniques will be developed for detection of attacks based upon non-login, pre-login, or incomplete login flooding, and these filtering mechanisms will be implemented on router cards at low expense, with a predicted high degree of success in limiting this type of DOS and DDOS attack.

In other words, future attack suppression technology is focused on preventing devices not connected to servers from pestering these servers repeatedly and from many sources with administrative requests, error reports, and deliberately incomplete login requests, all of which can deplete resources to the point that the attacked system can no longer function. Future attacks may therefore take the form of creating scripts that complete login connections and then repeatedly ask for service within the legitimate connection in order to bypass the filters in routers programmed to discard excess traffic that is not associated with a validly logged-in connection.

In a preferred embodiment of the invention, the challenge-response method, web servers respond to login contacts with a challenge to which it is trivially simple for a human operator to successfully respond correctly, but to which a programmed machine will have minimal odds of successfully responding. When implemented, any login activity that does not complete successfully can be shunted to a limited resource web server system component that will service all further requests originating from that requester. The decision process regarding level of service can be provided by the load balancing software typically found in medium and large web server sites (see FIG. 4). Further challenges can be issued with failure to correctly respond resulting in additional reduction or complete denial of service, and successful response resulting in continued service, possibly at an improved or normal level of service. Similarly, for connections running at a normal level of service, the web server could implement the challenge-response method periodically throughout the connection to identify robot machines that are masquerading as legitimate users and reduce or deny service to such suspected zombie machines.

The challenge-response mechanism works by making it very difficult for a machine without an extremely high degree of artificial intelligence installed to respond meaningfully to simple invitations to input data that a human operating the equipment would have no trouble completing. This will make it nearly impossible for a hacker who can install trojan-horse code on a large number of web-attached devices to make these devices capable of successfully logging in to a particular site and overwhelming that site with requests for service from within a connection.

In accordance with an exemplary embodiment, a challenge-response procedure works as follows. Users connect to a web site by identifying the target web site through an Internet browser, or equivalent. To connect to "XYZ Company," the user (or zombie script) enters "www.xyzco.com" and, in return, receives the initial login screen from the XYZ Company's web server. Under this challenge-response method, the logon screen contains no computer (language) recognizable text, such as EBCDIC or ASCII encoded characters. Rather all text, or at least that text related to the challenge, is a bit-mapped image of text, easily readable by a human. The text which is readable by humans but not machines, invites the user to continue the connection (logon) by clicking on one of several possible "radio buttons," or by entering text into a designated area or equivalent. There may be only one correct response and correct screen input area for that response, and the input area for the response can be randomly shuffled to further decrease the odds of a correct response by a zombie. The response from the device goes to the web's load balancing system, or other dedicated or shared resource available for evaluating the response, which assigns normal service to responses with the correct selection, and either rejects or connects end devices with incorrect responses to lower priority services, possibly including deliberate service delays. The incorrect response is logged and saved, with a record of the address of the requesting station being stored, as well as the discrete speed, streaming speed, and latency of the connecting device. Additional requests from that device will be recognizable as coming from a possible zombie and can be afforded even slower service or denied service completely.

After a user-defined number of incorrect responses, the address of an offending system and/or its latency and speed fingerprint can be added to the router-based filtering system so that packets from the offending device will be rejected and not reach the web server at all. In this manner, the web server can be protected from repetitive requests from non-human driven attacking systems from within connections or when establishing connections.

Figure 3:
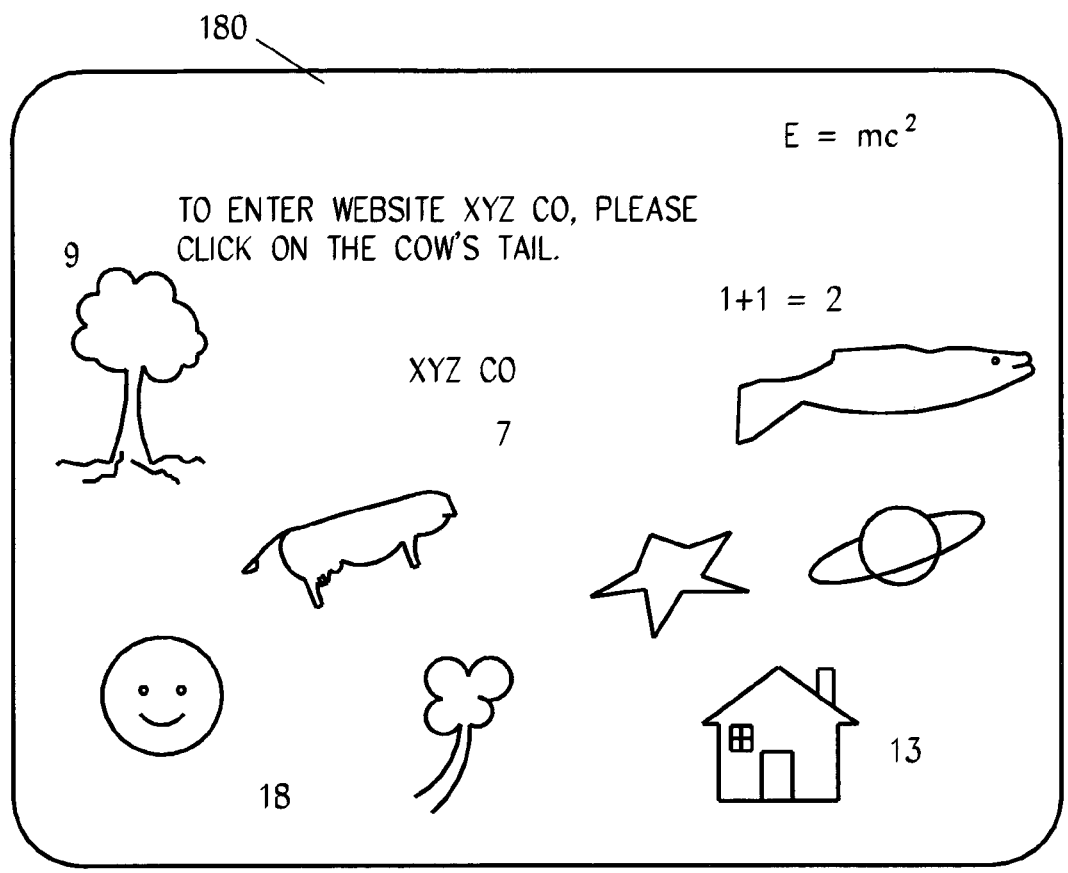
FIG. 3 illustrates a bit-encoded login challenge display of an exemplary embodiment of the invention.

FIG. 3 illustrates an example of the challenge/response method. FIG. 3 depicts a bit-encoded login challenge question, requiring the user to read a question and answer it. In this example, the login question is "TO ENTER WEBSITE XYZCO, PLEASE CLICK ON THE COW'S TAIL". The significance of bit encoding is that the challenge is not composed of machine readable USASCII or EBCDIC text. Rather, it is a picture of the text, which an ordinary machine cannot understand. A human will have no problem responding correctly, whereas a machine will be unable to do so. By bit-encoding the login challenge, zombies will be foiled from gaining access to the web site and launching attacks from within valid connections.

In the future, router filtering will be so efficient and powerful that DDOS attacks based upon pinging, spurious error messages, incomplete logins, and requests for status by non-logged in devices will be recognized and such traffic discarded before affecting the targeted web site and its servers. It can thus be predicted that DDOS attacks will be attempted from within validly logged in connections. This is because routers will very likely not be programmed to examine and interpret the contents of valid connections.sessions because of the difficulty and overhead involved, as well as for reasons of privacy and security. An example of an attack from within a validly logged-in session would take the form of enrolling armies of devices to connect to a server and periodically request a service, such as going to the Ford web site and pricing a red Crown Victoria, then a blue, diesel F-150, then a green 2 door Focus, etc. Such zombies would appear as normal users, and could consume huge amounts of resource. A non-zombie version of such an attack is possible, but it would require hundreds of humans coordinating their actions over a long period of time to accomplish this.

The method for discovering and diagnosing DDOS attacks by recognizing abnormal increases in utilization works as follows. Pending patent applications Silverman 1 and Silverman 2 describe a system and method for transmitting probative packets across a network and analyzing their transit times to determine the capacity of the network to handle streaming, discrete, and burst traffic, and their utilizations for these types of traffic. Zombie machines run scripts over and over, such scripts consisting of a variety of requests for service designed to flood a targeted web server and consume the web server's and/or its network's resources to the point that service to legitimate users is severely degraded or entirely prevented. As such, the zombie will have a rhythm or pattern of transmissions of discrete, burst, and stream packets that can serve as a fingerprint. There are known web sites from which hackers can download DDOS methods, such as:

http://www.technotronic.com/denial.html and
http://www.rootshell.com, and there are known tools for combining individual attack methods into scripts, and known tools (such as "trinoo" and "tribe") for combining groups of compromised systems into what CERT refers to as "distributed denial of service clusters."

It is thus possible to download known attack methods, scripts, and tools and run them on systems in a test network, record their rhythmic patterns, and extrapolate the effect that any number of such systems would have on a network, for networks, while bursty in nature, have characteristic utilization patterns (for example, peaks of utilization at 10 AM and 1 PM are common in commercial networks). The mathematics for the overlaying of a new traffic load introduced by n zombie attacking devices on an existing network is:

[((n * new load bits per second)+existing load bits per second)/network capacity bits per second]=new utilization Silverman 1 and 2 describe end to end network testing, and in their implementation in any end to end test a Tracroute command may be issued with which to locate all routers along that end to end path. The path from the test station (which can be installed in or co-located with any web server or router in the path) to any device or router in the path can thus be tested.

These advances make possible detection of hacker DDOS attacks regardless of whether or not the attacking devices are logged in to a site's servers, and also to pinpoint the location of the attacking devices, especially when teamed with fingerprinting of individual devices by means of their speed and latency characteristics.

By using the techniques in Silverman 1 and 2, both the pattern of current utilization and the projected effect of zombies on that segment of the network are tested. Each router along the path is thus be identified, and utilization spikes are identified and, by examining segments along a path, utilization increases are tracked to an origin point and thus attacks and individual zombies are identified without the extensive overhead, skill, and time-consumption required for reading traces and without needing to locate areas of low utilization. Moreover, the testing is performed from the web server site or from the ISP's network. This provides the additional advantage of allowing the manager of the web site to identify attacks and test for the locations of attackers without needing the cooperation of the ISP.

When attacking systems that have logged in are recognized, TCP window tuning may be used to slow down the connection. Silverman 1 and 2 formulas are used:

$Am$=average message size bytes (determined from testing common attack methods or from analysis of this attack instance)

$D$=network discrete speed (calculated from (long–short sample bits)*2/(best long–best short time)

$L$=network latency for this connection (calculated from best short round trip–service time for short sample)

$Ts$=service time for average attack message=$Am*8$/network $RTT$=round trip service time for average attack message and protocol acknowledgment,=$[((Am*8)+40)/$network discrete speed$]+L$ $S$=network streaming speed (calculated from virtual best burst sample arrival bits divided by arrival time)

$Wb$=optimum window bytes=$RTT/S/8$ $Wm$=optimum window messages=$Am/(RTT/S/8)$.

To provide degraded service by window manipulation, the connection window size (expressed as $Wb$ or $Wm$) is reduced to whatever fraction of the optimum is desired.

Additional methods for slowing the connection from attackers are:

instituting a delay parameter that slows acceptance of input from, or transmission of responses to attacking system (or any system in the "degraded service" category)

counterattacking by using denial of service methods on attacking systems (probably more suited to military, police, and counterinsurgency environments than business environments).

By way of example, the following mathematical calculation of utilization spike recognizes an attack and provides for decomposing the unitary end-to-end utilization measure into utilization by hop in a network. This routine answers the question, what is effect of change in utilization on response time?

1. User puts in a positive or negative percent change in discrete utilization (e.g. +10% or −8%), and an average round trip message size in number of characters.
2. Current discrete utilization %+change in discrete utilization %=U (where U is the new utilization %).
3. U/(1−U)=new queue factor. (Use multi server factor, if applicable).
4. New queue factor*average message size*8/discrete bandwidth=new queue delay.
5. New queue delay–old queue delay=change in response time.
6. Add new queue delay to service time plus latency to get the new average response time.

This estimation result is then used in the following way. The load imposed on the system by n zombies executing a known attack, such as a trinoo attack script, is estimated by testing for various values of n. From the network perspective, this load is expressed as a number of bits per second. For each link connection from the web site to the Internet, there is obtained an expected utilization, a fixed speed, and an estimated number of bytes on queue. (Bytes on queue is average wait time*discrete speed/8.) From utilization (denoted here as U), number of messages on queue is calculated by U/(1−U). Dividing queue depth in bytes by number of messages on queue the average message size is derived. Average service time for a message=average message size/conversational speed. Arrival rate=U/service time for average message. Arrival rate*average message size=bits per second in network system.

Applying the derivation of bits per second in network from utilization to the trinoo script for n users and for the expected network load allows summing the two to estimate the total bits per second on the Internet connection when attacked by n zombies. Thus is estimated the projected effect of zombie attacks under particular known attack scripts.

Figure 4:
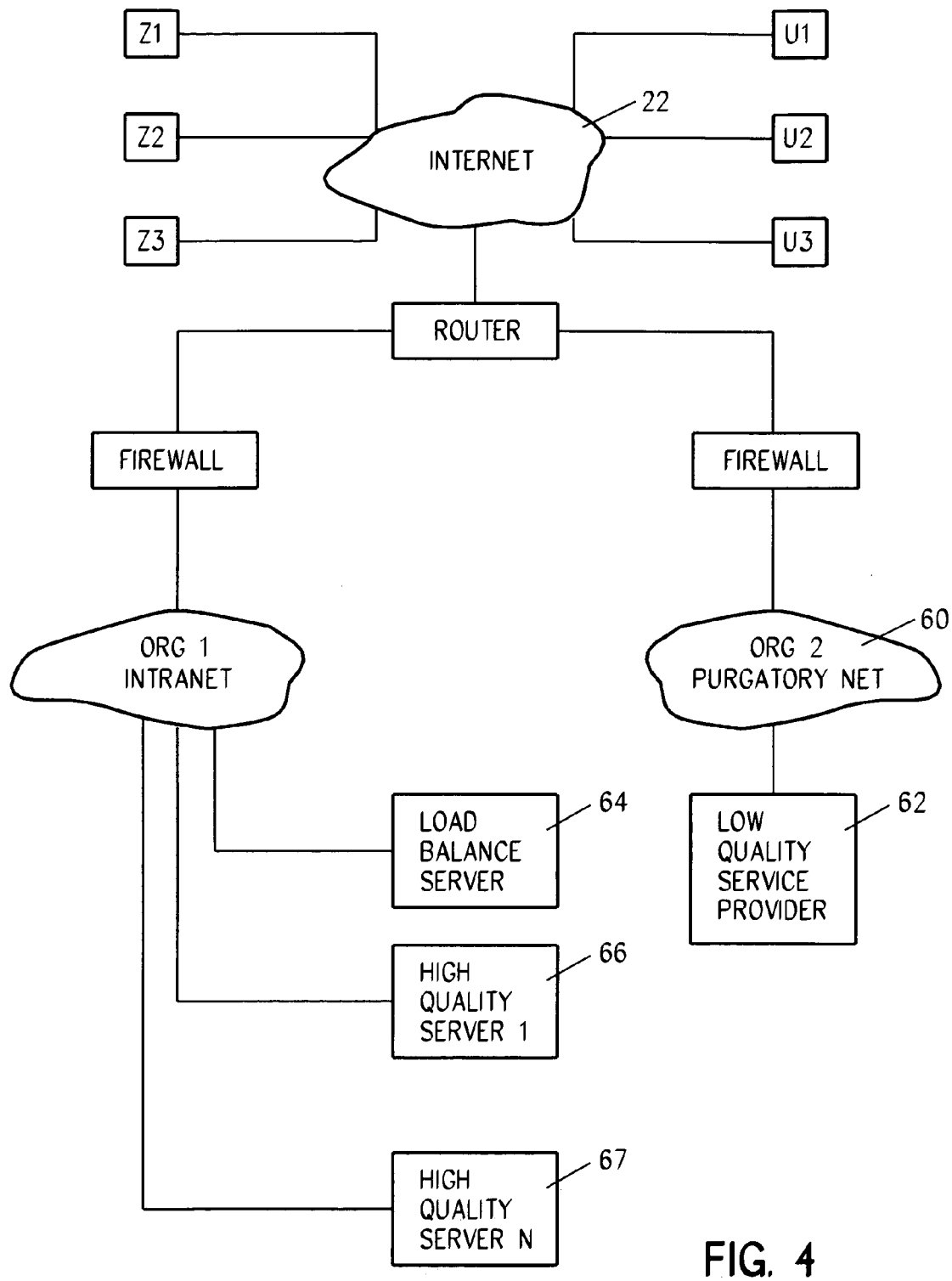
FIG. 4 illustrates an exemplary embodiment of the invention for load balancing a distributed denial of service attack to a low quality service provider.

Referring to FIG. 4, devices Z1–Z3 identified as being zombies and/or suspected of being zombies are shunted to the organization's (or ASP's) purgatory net 60, which provides low quality service through provider 62. This keeps the zombie Z1–Z3 occupied and, much the way police try to keep someone demanding ransom on the phone for as long as possible, the purgatory connection maintains contact with the suspect so that additional diagnosis can be performed and so that the zombie focuses on doing its mischief in a place where it does no harm. Normal devices get first class service from the organization's (or ASP's) regular servers 66–67. A device merits a purgatory connection if it fails the bit-encoded login test or if it is performing suspicious operations characteristic of those involved in DOS attacks.

Advantages Over the Prior Art

The advantages of the system and method of the preferred embodiment of this invention include providing an improved system and method for detection and prevention of DOS (Denial of Service) and DDOS (Distributed Denial of Service) attacks.

The preferred embodiment provides a means for web site owners to locate areas of lower and higher utilizations within ISP networks, so that faster detection of DDOS attacks is possible and faster location by the ISP of specific attacking devices is possible.

It is a further advantage of the preferred embodiment that utilization patterns of known attack scripts can be identified and numbers of attackers can thus be estimated for each Internet interface, thus providing a new means for detection of attacks and estimation of the magnitude of the attack on each interface.

It is a further advantage of the preferred embodiment that detection of individual attacking machines is made possible by causing login invitations to be sent in bit-mapped form as opposed to text, thereby defeating zombie machines from being able to login to the webserver site, thereby preventing attacks from within connected sessions.

It is a further advantage that machines identified as attackers can be further profiled by the streaming speed, discrete speed, and latency of their network connection, even if they try to masquerade by repeatedly changing their network address.

It is a further advantage that having identified attacking devices, a lowered level of service can be offered, service can be denied, or counterattacking measures can be implemented against the attackers.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as IBM Systems designated as zSeries, iSeries, xSeries, and pSeries, or the like and pursuant to one or more, or a part of one or more, program elements, modules or objects generated from any programming language, such as C++, Java, Pl/1, Fortran or the like.

And still further, each said step, or a file or object or the like implementing each said step, may be executed by special purpose hardware or a circuit module designed for that purpose.

Accordingly, the scope of protection of this invention is limited only by the following claims and their equivalents.

I claim:

1. A computer implemented method for detecting denial of service attacks, comprising the steps of:
    issuing a bit encoded login challenge composed of human viewable images not composed of machine readable text in response to a login request to said computer from a requester of services; and
    responsive to an incorrect response to said challenge, said computer placing said requester in a state of limited service.

2. The computer implemented method of claim 1, further comprising the steps of:
    filtering out to said state of limited service iterative connection requests from a network address of a hacker device.

3. The computer implemented method of claim 1, further comprising the step of:
    responsive to speed, latency and average queuing network delay of connection requests, detecting and placing in a state of limited service repetitive login requests from a hacker device.

4. The computer implemented method of claim 3, further comprising the steps of:
    determining from said speed, latency and average queuing network delay a time-out value; and
    detecting as a request from a hacker device a request that does not complete within said time-out value.

5. The computer implemented method of claim 1, further comprising the steps of:
    issuing further challenges to subsequent requests for service from said requester and selectively responding to successful responses by continuing service at the same or improved level and to unsuccessful responses by further reduction or complete denial of service.

6. The computer implemented method of claim 1, further comprising the steps of:
    periodically issuing said challenges throughout connection to a requester successfully responding.

7. The computer implemented method of claim 1, comprising the step of issuing said bit-mapped challenge as logon image from which a user must select or enter a response.

8. The computer implemented method of claim 7, further comprising the step of occasionally shifting the input area for a valid response to said challenge.

9. The computer implemented method of claim 1, further comprising the step of slowing acceptance from and response to systems in a degraded service category.

10. The computer implemented method of claim 1, further comprising the step of counterattacking by executing a denial of service response to attacking systems.

11. A computer implemented method for detecting denial of service attacks, comprising the steps of:
    executing a bit-encoded challenge and response login procedure and a network probing test frame transmission and analysis procedure to detect a hacker denial of service attack, said bit-encoded challenge comprising human viewable images not composed of machine readable text;
    said network probing test frame transmission and analysis procedure including defining a signature of discrete speed, streaming speed, and latency of the connecting device failing said bit-encoded challenge-response login procedure, and adding said signature to a router based filter for filtering out login requests from said hacker responsive to said signature; and responsive to detecting said denial of service attack, placing said hacker in a lower level of service state.

12. A computer implemented method for detecting denial of service attacks, comprising the steps of:
   selecting sending and receiving probative test packets through a network;
   responsive to said packets, determining network evaluation parameters for said network;
   responsive to said network evaluation parameters, determining presence of network denial of service attacks, said network evaluation parameters including response time and throughput characteristics of said network, said throughput characteristics including capacity, utilization, and performance; and
   executing a bit-encoded challenge and response procedure to discourage and repel said attacks, said bit-encoded challenge comprising human
   viewable images not composed of machine readable text.

13. The computer implemented method of claim 12, further comprising the steps of:
   determining a latency and speed fingerprint of an offending device;
   responsive to said fingerprint, operating a router filtering system to reject packets from said offending device.

14. The computer implemented method of claim 13, said fingerprint comprising a rhythm of transmissions of discrete, burst, and stream packets.

15. A computer implemented probative test and analysis method for detecting and responding to denial of service attacks on a network resource, comprising the steps of:
   creating a template of attack patterns;
   determining historical, current, and predicted states of said network for each of a plurality of types of network traffic;
   responsive to said attack patterns, determining if a spike in network traffic is a distributed denial of service attack and, if so, determining its source; and
   denying full service to sources associated with said service attack.

16. The computer implemented method of claim 15, further comprising the steps of:
   determining unique speed and latency network attachment characteristics of devices attempting to connect to said network resource; and
   responsive to detection of an abusive behavior from a said device, responding to subsequent requests for service from said device by denying said full service to said device.

17. A computer program product for detecting denial of service attacks, comprising:
   a computer readable medium;
   first program instructions to issue a bit encoded login challenge comprising human viewable images not composed of machine readable text in response to a login request from a requester of services;
   second program instructions, responsive to an incorrect response to said challenge, to place said requester in a state of limited service; and wherein
   said first and second program instructions are recorded on said computer readable medium.

18. The computer program product of claim 17, further comprising:
   third program instructions for filtering out to said state of limited service iterative connection requests from a network address of a hacker device; and wherein
   said third program instructions are recorded on said computer readable medium.

19. The computer program product of claim 17, further comprising:
   third program instructions, responsive to speed, latency and average queuing network delay of connection requests, for detecting and placing in a state of limited service repetitive login requests from a hacker device; and wherein
   said third program instructions are recorded on said computer readable medium.

20. The computer program product of claim 17, further comprising:
   third program instructions for determining from said speed, latency and average queuing network delay a time-out value;
   fourth program instructions for detecting as a request from a hacker device a request that does not complete within said time-out value; and wherein
   said third and fourth program instructions are recorded on said computer readable medium.

21. The computer program product of claim 17, further comprising:
   third program instructions for issuing further challenges to subsequent requests for service from said requester and selectively responding to successful responses by continuing service at the same or improved level and to unsuccessful responses by further reduction or complete denial of service; and wherein
   said third program instructions are recorded on said computer readable medium.

22. The computer program product of claim 17, further comprising:
   third program instructions for periodically issuing said challenges throughout connection to a requester successfully responding; and wherein
   said third program instructions are recorded on said computer readable medium.

23. The computer program product of claim 17, further comprising
   third program instructions for issuing said bit-mapped challenge as logon image from which a user must select or enter a response; and wherein
   said third program instructions are recorded on said computer readable medium.

24. The computer program product of claim 23, further comprising
   fourth program instructions for occasionally shifting the input area for a valid response to said challenge; and wherein
   said fourth program instructions are recorded on said computer readable medium.

25. The computer program product of claim 17, further comprising
   third program instructions for slowing acceptance from and response to systems in a degraded service category; and wherein
   said third program instructions are recorded on said computer readable medium.

26. The computer program product of claim 17, further comprising
   third program instructions for counterattacking by executing a denial of service response to attacking systems; and wherein said third program instructions are recorded on said computer readable medium.

27. A computer program product for detecting denial of service attacks, comprising:

a computer readable medium;

first program instructions for executing a network probing test frame transmission and analysis procedure including requiring response of a user to presentation of human viewable images not composed of machine readable text to detect a hacker denial of service attack;

second program instructions, responsive to detecting a denial of service attack, for placing said hacker in a state of lower level of service; and wherein said first and second program instructions are recorded on said computer readable medium.

28. A computer program product for detecting denial of service attacks, comprising:

a computer readable medium first program instructions to selectively send and receive probative test packets through a network;

second program instructions, responsive to said packets, to determine network evaluation parameters for said network;

third program instructions, responsive to said network evaluation parameters, to determine presence of network denial of service attacks, said network evaluation parameters including response time and throughput characteristics of said network, said throughput characteristics including capacity, utilization, and performance;

fourth program instructions to execute a bit-encoded challenge and response procedure to discourage and repel said attacks, said bit-encoded challenge comprising human viewable images not composed of machine readable text; and wherein said first, second, third, and fourth program instructions are recorded on said computer readable medium.

* * * * *